United States Patent
Ostrowski et al.

(10) Patent No.: US 8,430,311 B2
(45) Date of Patent: *Apr. 30, 2013

(54) SYSTEMS AND METHODS FOR MERCHANDISE AUTOMATIC CHECKOUT

(75) Inventors: Jim Ostrowski, South Pasadena, CA (US); Mario Munich, Sierra Madre, CA (US); John Wiseman, Los Angeles, CA (US)

(73) Assignee: Datalogic ADC, Inc., Eugene, OR (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/074,263

(22) Filed: Feb. 29, 2008

(65) Prior Publication Data

US 2009/0152348 A1 Jun. 18, 2009

Related U.S. Application Data

(63) Continuation of application No. 10/554,516, filed as application No. PCT/US2005/006079 on Feb. 28, 2005, now Pat. No. 7,337,960, which is a continuation-in-part of application No. 11/023,004, filed on Dec. 27, 2004, now Pat. No. 7,100,824.

(60) Provisional application No. 60/548,565, filed on Feb. 27, 2004, provisional application No. 60/621,551, filed on Oct. 22, 2004.

(51) Int. Cl.
*G06K 15/00* (2006.01)

(52) U.S. Cl.
USPC .......................................................... 235/383

(58) Field of Classification Search ................... 235/383
See application file for complete search history.

(56) References Cited

U.S. PATENT DOCUMENTS

| 4,676,343 A | 6/1987 | Humble |
| 4,929,819 A | 5/1990 | Collins |

(Continued)

FOREIGN PATENT DOCUMENTS

| EP | 0672993 | 9/1995 |
| EP | 0689175 | 12/1995 |
| EP | 0843293 | 5/1998 |

OTHER PUBLICATIONS

Ostrowski, "Systems and Methods for Merchandise Checkout", U.S. Appl. No. 11/466,371, filed Aug. 22, 2006 (assigned to assignee of the present application).

(Continued)

*Primary Examiner* — Steven S Paik
*Assistant Examiner* — Tae Kim
(74) *Attorney, Agent, or Firm* — Stoel Rives LLP

(57) ABSTRACT

Systems and methods for automatically checking out items located on a moving conveyor belt for the purpose of increasing the efficiency of a checkout process and revenue at a point-of-sale. The system includes a conveyor subsystem for moving the items, a housing that enclosed a portion of the conveyor subsystem, a lighting subsystem that illuminates an area within the housing, visual sensors that can take images of the items including UPCs, and a checkout system that receives the images from the visual sensors and automatically identifies the items. The system may include a scale subsystem located under the conveyor subsystem to measure the weights of the items, where the weight of each item is used to check if the corresponding item is identified correctly. The system relies on matching visual features from images stored in a database to match against features extracted from images taken by the visual sensors.

14 Claims, 9 Drawing Sheets

U.S. PATENT DOCUMENTS

| | | | | |
|---|---|---|---|---|
| 5,115,888 | A | * | 5/1992 | Schneider ................. 186/61 |
| 5,495,097 | A | * | 2/1996 | Katz et al. ............. 235/462.12 |
| 5,543,607 | A | | 8/1996 | Watanabe et al. |
| 5,609,223 | A | | 3/1997 | Lizaka et al. |
| 5,883,968 | A | * | 3/1999 | Welch et al. ............. 382/100 |
| 5,967,264 | A | | 10/1999 | Lutz et al. |
| 6,047,889 | A | | 4/2000 | Williams et al. |
| 6,069,696 | A | | 5/2000 | McQueen et al. |
| 6,236,736 | B1 | | 5/2001 | Crabtree et al. |
| 6,332,573 | B1 | | 12/2001 | Gu et al. |
| 6,363,366 | B1 | | 3/2002 | Henty |
| 6,550,583 | B1 | | 4/2003 | Brenhouse |
| 6,598,791 | B2 | | 7/2003 | Bellis, Jr. et al. |
| 6,606,579 | B1 | * | 8/2003 | Gu .......................... 702/181 |
| 6,860,427 | B1 | * | 3/2005 | Schmidt et al. ........ 235/462.32 |
| 6,915,008 | B2 | * | 7/2005 | Barman et al. ............. 382/154 |
| 7,044,370 | B2 | | 5/2006 | Bellis, Jr. et al. |
| 7,100,824 | B2 | | 9/2006 | Ostrowski et al. |
| 7,246,745 | B2 | | 7/2007 | Hudnut |
| 7,325,729 | B2 | | 2/2008 | Crockett et al. |
| 7,334,729 | B2 | | 2/2008 | Brewington |
| 7,477,780 | B2 | * | 1/2009 | Boncyk et al. ............. 382/165 |
| 2002/0138374 | A1 | * | 9/2002 | Jennings et al. ............. 705/29 |
| 2003/0018897 | A1 | | 1/2003 | Bellis, Jr. et al. |
| 2003/0026588 | A1 | | 2/2003 | Elder et al. |
| 2003/0184440 | A1 | | 10/2003 | Ballantyne |
| 2005/0060324 | A1 | | 3/2005 | Johnson et al. |
| 2005/0173527 | A1 | | 8/2005 | Conzola |
| 2006/0283943 | A1 | | 12/2006 | Ostrowski |
| 2007/0084918 | A1 | | 4/2007 | Tabet et al. |

OTHER PUBLICATIONS

Goncalves, "Self Checkout With Visual Recognition," U.S. Appl. No. 12/229,069, filed Aug. 18, 2008 (assigned to assignee of the present application).

http://www.ftxs.fujitsu.com/fujitsutemp.asp?navid=1020, accessed Feb. 25, 2005, 3 pp.

http://www.ftxs.fujitsu.com/fujitsutemp.asp?navid=1021, accessed Feb. 25, 2005, 7 pp.

http://www.ftxs.fujitsu.com/fujitsutemp.asp?navid=1022, accessed Feb. 25, 2005, 3 pp.

http://www.ftxs.fujitsu.com/fujitsutemp.asp?navid=1023, accessed Feb. 25, 2005, 3 pp.

* cited by examiner

SYSTEMS AND METHODS FOR MERCHANDISE AUTOMATIC CHECKOUT

CROSS REFERENCE TO RELATED APPLICATIONS

This application is a continuation of U.S. patent application Ser. No. 10/554,516, filed Oct. 25, 2005, now U.S. Pat. No. 7,337,960, which is a national stage application of International Patent Application No. PCT/US05/06079 filed Feb. 28, 2005, which is a continuation-in-part of U.S. patent application Ser. No. 11/023,004 filed on Dec. 27, 2004, now U.S. Pat. No. 7,100,824, and claims benefit of U.S. Provisional Patent Application No. 60/548,565 filed on Feb. 27, 2004, and U.S. Provisional Patent Application No. 60/621,551 filed on Oct. 22, 2004; all of which are hereby incorporated by reference herein.

BACKGROUND OF THE INVENTION

The present invention generally relates to object recognition and, more particularly, to systems and method for automatically detecting objects based on pattern recognition and weight measurement.

In many retail store environments, such as in grocery stores, department stores, office supply stores, home improvements stores, and the like, consumers use shopping carts to carry merchandise. Upon entering a check out lane, a shopper must frequently unload the merchandise, and place the merchandise on a conveyor belt so that a store clerk can pick up each item, rotate the merchandise until a bar code is found, and then position the bar code in front of a reader. This results in delays for both the shopper and store. In turn, this can result in lost revenue to the store inasmuch as revenue is dependent upon the speed at which the store can get shoppers through a check out line.

One of the goals within the retail industry has been to design the checkout stand in a manner that can expedite the checkout process and provide convenience to the customers and the cashier. In an effort to increase throughput and checkout efficiency, several self-checkout systems have been developed for retail environments. Self-checkout systems, such as those marketed by Fujitsu, Inc. <URL: http://www.ftxs.fujitsu.com>, operate like conventional checkout systems with a difference that these systems have the customer replace the cashier, and as a consequence, may reduce labor and turnover costs. The self-checkout system marketed by Fujitsu operates as a point-of-sale. To process transactions of the items to be checked out, the customer may scan the UPC of each item and put the item on a weighing scale. Then, the self-checkout system looks up a database to get the weight data of the item. If the weight data of the item matches the reading of the weighing scale, the item is added to a checkout list. Thus, these existing self-checkout systems rely on customers to process the merchandise. Typically, the customers are not as experienced as the cashiers in processing the merchandise, and as a consequence, exiting self-checkout systems may be slower in processing the merchandise than the conventional checkout systems. This can result in lost revenue to the store negating the savings in cashier's labor cost if revenue is dependent upon the checkout speed.

As can be noticed, a self-checkout system can yield high throughput and reduce labor and turnover costs if the system can detect and recognize items in the absence of a user needing to physically scan UPCs and/or weigh the items individually. Thus, there is a need for an improved apparatus and methods that can recognize items for self-checkout of merchandise in the absence of a user's intervention to scan the UPC and/or weigh each item.

SUMMARY OF THE INVENTION

In one aspect of the invention, a system for self-checking out an object includes: a scale subsystem for measuring a weight of the object; at least one visual sensor for taking at least one image of the object; and a check out subsystem coupled to the at least one visual sensor and the scale subsystem and configured to recognize the object by analyzing the at least one image and the weight.

In another aspect of the invention, a system for checking out an object includes: a check out lane; a conveyor subsystem adjacent the lane; at least one visual sensor for taking at least one image of the object on the conveyor subsystem; a scale subsystem for measuring a weight of the object; and a check out subsystem configured to receive the at least one image from the at least one visual sensor and the weight from the scale subsystem and analyze the at least one image and the weight to recognize the object.

In still another aspect of the invention, a method of self-checking out an object includes steps of: placing the object on a conveyor subsystem; moving the object inside a controlled lighted area via the conveyor subsystem; detecting the object; recognizing the object; measuring a weight of the object in the absence of human intervention; determining if the weight matches the object; and in case of match, adding the object to a checkout list.

In yet another aspect of the invention, a method of checking out an object includes steps of: placing a first separator ahead of the object; placing the object on a conveyor subsystem; placing a second separator behind the object on the conveyor subsystem; starting a transaction upon recognizing the first separator; detecting the object; turning on a lighting subsystem; capturing one or more images of the object; recognizing the object based on the one or more images; recognizing a UPC of the object; measuring the weight of the object; determining if the weight matches the object if UPC is recognized; in case of match, adding the object to a checkout list, in case of no match, sending a notification of an exception, stopping the conveyor subsystem, and resolving the exception; and terminating the transaction upon recognizing the second separator. The notification of an exception can be transferred through an Ethernet connection linking a plurality of subsystems or through at least one wireless device linking a plurality of subsystems.

In a further aspect of the invention, a method of automating a self-checkout transaction includes steps of: moving an object on a conveyor subsystem; receiving visual image data of the object from a visual subsystem; analyzing received visual image data to extract one or more visual features; comparing the one or more visual features with feature data stored in an object database to find a set of matches; sending a recognition alert; measuring a weight of the object using a scale subsystem located under the conveyor subsystem; determining if the weight matches the object; if the determination is positive, adding the object to a checkout list; and if the determination is negative, sending a notification of an exception, stopping the conveyor subsystem, and resolving the exception. The notification of an exception can be transferred between the subsystems through an Ethernet connection linking a plurality of subsystems or through at least one wireless device linking the subsystems. Alternatively, the visual subsystem captures visual image data for color and shape recognition, tracking of object and detection of the size of the objects.

In another aspect of the invention, a system for self-checking out an object includes: a conveyor subsystem configured to move the object; a housing that encloses a portion of the conveyor subsystem; at least one visual sensor configured to capture at least one image of the object and mounted on the housing; a lighting subsystem that illuminates an area within the housing and is mounted on the housing; a motion trigger subsystem for detecting the object and triggering the lighting subsystem and the at least one visual sensor; and a check out subsystem coupled to the at least one visual sensor and configured to recognize the object by analyzing the at least one image. Alternatively, the visual subsystem captures visual image data for color and shape recognition, tracking of object and detection of the size of the objects.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides systems and methods through which one or more visual sensors, such as one or more cameras, operatively coupled to a computer system can view, recognize and identify items moving on a conveyor subsystem for automatic check out in the absence of human intervention. Hereinafter, the term "automatic" refers to the "absence of a user's or human's intervention or efforts, particularly in connection with not having to put an item on a scale or to scan the UPC of an item as in the case of conventional checkout systems. For example, the items may be checked out for purchase in a store, and as a further example, the items may be located on a conveyor belt adjacent a checkout lane of a store environment. One or more visual sensors can be placed in a housing that covers a portion of the conveyor belt such that merchandise images may be obtained as the merchandise moves through the housing. Using the images, the merchandise is automatically recognized.

In contrast to existing checkout systems that require a customer's intervention on each item, the present invention provides for items to be recognized by analyzing the images and charged in a point-of-sale subsystem. A weighing scale (or, equivalently scale subsystem) may be operatively located adjacent the conveyor belt and operated (without human intervention) in tandem with the visual sensor(s) to weigh items sold by weight. The reading of the scale subsystem for each recognized item may be compared with the weight data of the item stored in a database to determine if the item has been recognized correctly.

Figure 1:
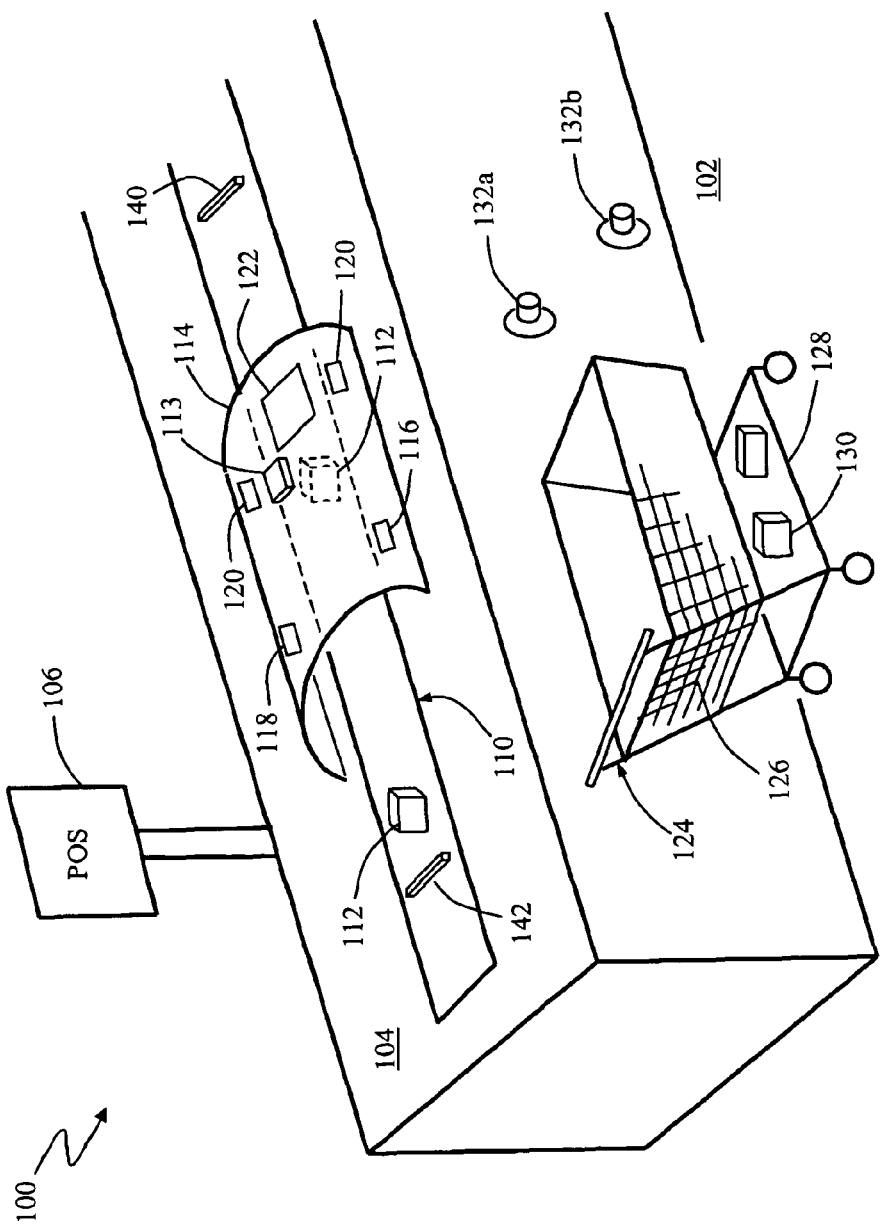
FIG. 1 illustrates a system for merchandise automatic checkout in accordance with one embodiment of the present invention.

FIG. 1 illustrates an embodiment of a self-check out system 100 that may include a checkout lane 102 of a store environment (not to scale) and a checkout counter 104. A point-of-sale (POS) (or, equivalently checkout subsystem) 106, such as a cash register, may rest on the checkout counter 104. One or more input devices may be coupled to the POS subsystem 106. Exemplary input devices may include a barcode scanner, a scale, a keyboard, keypad, touch screen, card reader, and the like. In one embodiment, the POS subsystem 106 may correspond to a checkout terminal used by a checker or cashier. In another embodiment, the POS subsystem 106 may correspond to a self-service checkout terminal.

The checkout system 100 may further include a merchandise conveyor subsystem 110 that may be part of a conveyor belt machine well known in the supermarket industry. For convenience, hereinafter, the terms conveyor subsystem and conveyor belt may be used interchangeably. The conveyor subsystem 110 may be used to place merchandise 112 on it by a shopper. So placed, the conveyor subsystem 110 may then move the merchandise 112 in one of the following manners. In one embodiment of the present invention, the conveyor belt 110 may move continuously. In another embodiment, the conveyor belt 110 may start moving when a conventional motion detector, such as IR detector, detects a customer approaching the checkout lane 102 and sends a signal to the conveyor belt 110. In still another embodiment, a scale subsystem 122 may start the conveyor belt 110 upon detection of any weight on the conveyor belt 110. It should be apparent to those of ordinary skill in the art that the location of the scale subsystem 122 can be any where along the conveyor belt 110 including but not limited to the beginning of the conveyor belt 110. In one exemplary embodiment, the scale subsystem 122 can be located at the beginning of the conveyor belt 110 to provide an indication that there is merchandise 112 on the conveyor belt 110 waiting to be checked out. When the scale subsystem 122 detects merchandise 112 on the conveyor belt 110, it will send a signal to start moving the conveyor belt 110 and to begin the automatic checkout process.

A housing 114 may be placed over the conveyor belt 110 and cover a portion of the conveyor belt 110. As the housing 114 functions as a structure where a motion trigger subsystem 116, one or more visual cameras 120, and a lighting subsystem 118 are mounted, it may have any dimension or shape that accommodates the flow of items therethrough. The housing may also include a UPC reader subsystem 113 configured to recognize the UPC of the merchandise 112 contained in the image. In one embodiment, the UPC reader subsystem 113 may be a conventional UPC scanner. In an alternative embodiment, the UPC recognition may be done with a visual sensor.

Within the housing 114, a motion trigger subsystem 116 may be employed to detect the merchandise 112 moving on the conveyor subsystem 110 and past the motion trigger subsystem 116. The motion trigger subsystem 116 may include sensor(s), such as conventional IR detectors. The motion trigger subsystem 116 may be coupled to a lighting subsystem 118. Upon detection of the merchandise 112 by the motion trigger subsystem 116, the motion trigger subsystem 116 may trigger the lighting subsystem 118 to light the interior of the housing 114 to provide optimum light illumination when the visual sensors 120 capture visual images.

The motion trigger subsystem 116 may be also coupled to the visual sensors 120 and trigger the visual sensors 120 to obtain images of the merchandise 112. Triggering of the visual sensors 120 and lighting subsystem 118 may be synchronized such that the lighting subsystem 118 can provide optimum illumination. Alternatively, the motion trigger subsystem 116 can be turned on automatically based on a signal sent by the visual sensor 120 when it detects a motion of merchandise 112 passing through. The automatic checkout process can be initiated when the motion trigger subsystem 116 is turned on. For simplicity, only two visual sensors 120 are shown in FIG. 1. However, it should be apparent to those of ordinary skill that the present invention may be practiced with any number of visual sensors.

As will be described in greater detail later in connection with FIG. 6, the visual sensors (or, collectively, visual subsystem) 120 may be used to recognize the presence and identity of the merchandise 112 and provide an indication or instruction to the POS subsystem 106. The visual sensors 120 may also determine the size of the merchandise 112 by analyzing the visual images of the merchandise 112, as described in connection with FIGS. 2, 3, 6 and 7. In addition, the visual sensors 120 may track which merchandise has been recognized and which has not. Each of the visual sensors 120 may be a digital camera with a CCD imager, a CMOS imager, an infrared imager, and the like. The visual sensors 120 may include normal lenses or special lenses, such as wide-angle lenses, fish-eye lenses, omni-directional lenses, and the like. Further, the lens may include reflective surfaces, such as planar, parabolic, or conical mirrors, which may be used to provide a relatively large field of view or multiple viewpoints.

It can also be seen in FIG. 1 that the checkout system 100 may further include a scale subsystem 122, which can be employed to weigh merchandise 112, for example, when the merchandise is fruit or vegetables. The structural incorporation of the scale subsystem 122 with the conveyor belt 110 is well known in the art and not detailed for simplicity. By way of example, and as further described below, via the visual sensors 120, the system 100 may determine the particular fruit or vegetable based on images of its color, texture, and/or shape. So determined, the system 100 may then charge a price of the particular fruit or vegetable based on its weight and price/pound.

The scale subsystem 122 may also be used to check if the merchandise 112 is correctly recognized based on the analysis of images captured by the visual sensor 120. As will be described in connection with FIGS. 2-3, the system 100 may use the visual images captured by the visual sensors 120 to recognize the merchandise 112. Then, the system 100 may look up its object database 302 (shown in FIG. 3) to obtain the weight data and/or Universal Product Code (UPC) information of the recognized merchandise 112. By comparing the reading of the scale subsystem 122 for the recognized merchandise 112 with the weight data and/or UPC information, the system 100 may determine if the merchandise 112 has been correctly recognized.

Illustratively, the reading of the scale subsystem 122 may not match the weight data and/or UPC information if one or more items are stacked on top of each other on the conveyor subsystem 110. The visual sensors 120 may try to recognize the stacked items as a single item and may result a false recognition. In case of mismatch between the reading and the weight data and/or UPC information, the merchandise 112 may raise an exception as described later.

At the time of product manufacture and/or packaging the merchandise 112, one or more special markings, such as ID number or UPC code, may be introduced onto the merchandise packaging. The special markings may be printed in ink that is not visible under normal lighting but visible under special lighting, such as UV (or IR) lighting, wherein the lighting subsystem 118 may include a light source for illuminating the special markings. Illustratively and without limitation, the ink may be an invisible UV fluorescent ink used for conventional security and authentication. As the special markings may be invisible to the naked eye, they can be printed in various sizes and, if needed, cover the entire surface of the package without detracting from the advertisement/eye-appeal of the package design. During the checkout process, the merchandise 112 may be illuminated by the lighting subsystem 118 to reveal the imprinted special markings. Then, the visual sensors 120 may capture visual images including the special markings and analyze the visual images to identify the merchandise 112, as described in connection with FIGS. 2, 3, 6 and 7.

During checkout, a shopping cart 124 may occupy the check out lane 102 adjacent the conveyor subsystem 110. The shopping cart 124 may include a basket 126 and a lower shelf 128. One or more items 128 may be carried on the basket 126 and lower shelf 128 inadvertently or intentionally to defraud the store. To prevent the bottom-of-the-basket loss, additional visual sensors 132a-b may be located adjacent the check out lane 102 such that the item 130 may be at least partially within the field of view of the visual sensor 132a-b. More detail on the bottom-of-the-basket prevention is referred to U.S. patent application entitled "Systems and Methods for Merchandise Checkout" filed on Dec. 27, 2004, Ser. No. 11/023,004, which is hereby incorporated herein by reference in its entirety.

The system 100 may start a new transaction upon recognition of a first separator 140. The first separator 140 may be, for example, a plastic bar that the system 100 is trained to recognize based on ViPR (visual pattern recognition). Such recognition of a separator bar 140 may be based on a variety of characteristics including but not limited to features, colors, sizes and shapes. To indicate the end of the transaction, the customer may place a second separator 142, wherein the system 100 is also trained to recognize the second separator 142.

Figure 2A:
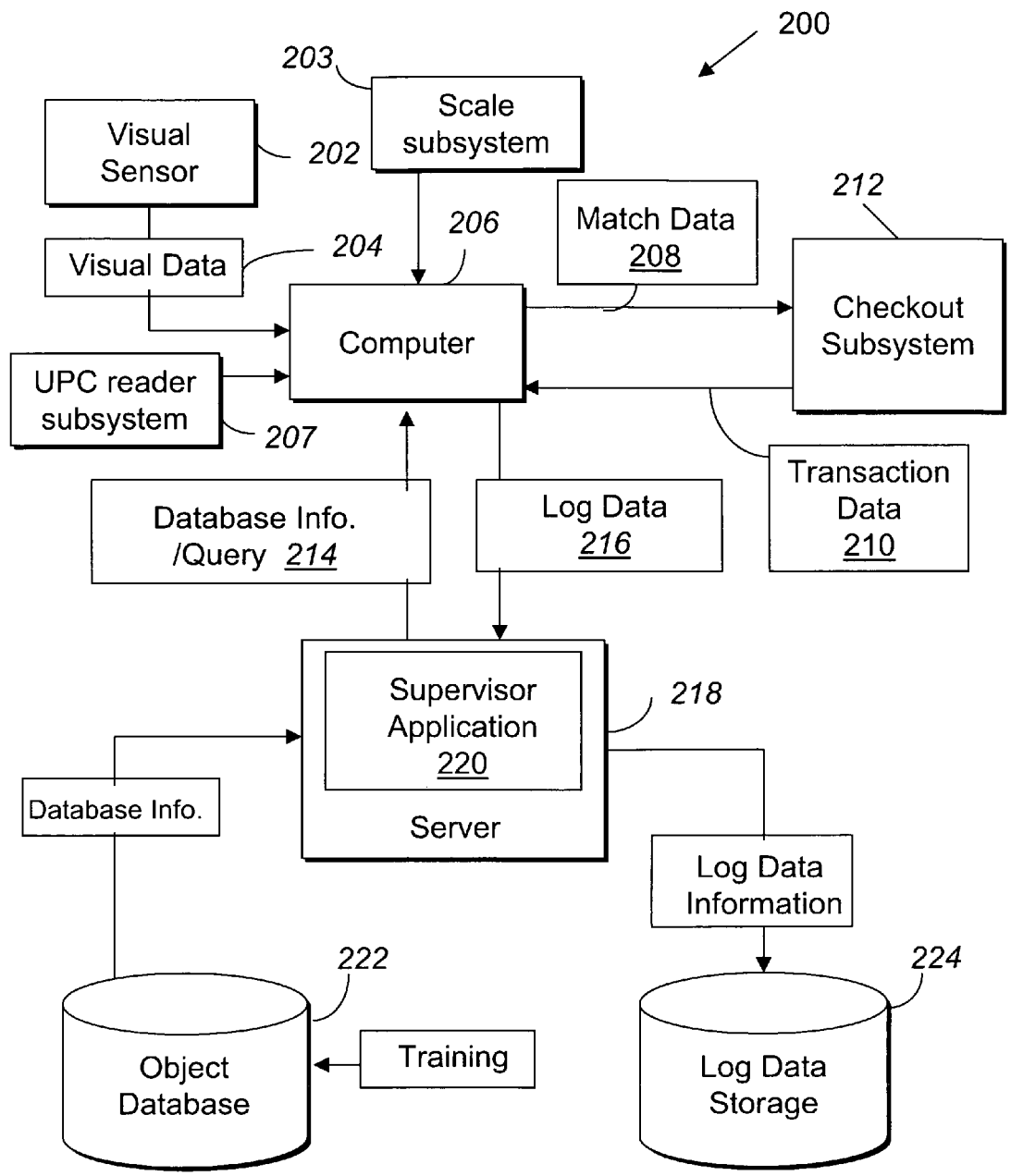
FIG. 2A illustrates one embodiment of a recognition system included in the check out system shown in FIG. 1.

FIG. 2A illustrates an embodiment 200 of a recognition system included in the automatic check out system 100 in FIG. 1. It will be understood that the system 200 may be implemented in a variety of ways, such as by dedicated hardware, by software executed by a microprocessor, by firmware and/or computer readable medium executed by a microprocessor or by a combination of both dedicated hardware and software. Also, for simplicity, only one visual sensor 202 and one checkout subsystem 206 are shown in FIG. 2A. However, it should be apparent to those of ordinary skill that any number of visual sensors and checkout subsystems may be used without deviating from the spirit and scope of the present invention.

The visual sensor 202 may capture images of the items 112 and send visual data 204 to the computer 206 that may process the visual data 204. In one embodiment, the visual data 204 may include the visual images of the one or more items 112. It will be understood that the visual sensor 202 may communicate with the computer 206 via an appropriate interface, such as a direct connection or a networked connection. This interface may be hard wired or wireless. Examples of interface standards that may be used include, but are not limited to, Ethernet, IEEE 802.11, Bluetooth, Universal Serial Bus, FireWire, S-Video, NTSC composite, frame grabber, and the like.

The computer 206 may analyze the visual data 204 provided by the visual sensor 202 and identify visual features of the visual data 204. In one example, the features may be identified using an object recognition process that can identify visual features of an image. In another embodiment, the visual features may correspond to scale-invariant features. The concept of scale-invariant feature transformation (SIFT) has been extensively described by David G. Lowe, "Object Recognition from Local Scale-invariant Features," Proceedings of the International Conference on Computer Vision, Corfu, Greece, September, 1999 and by David G. Lowe, "Local Feature View Clustering for 3D Object Recognition," Proceedings of the IEEE Conference on Computer Vision and Pattern Recognition, Kauai, Hi., December, 2001; both of which are incorporated herein by reference.

It is noted that the present invention teaches an object recognition process that comprises two steps; (1) feature extraction and (2) recognize the object using the extracted features. However, It is not necessary to extract the features to recognize the object.

The computer 206 may be a PC, a server computer, or the like, and may be equipped with a network communication device such as a network interface card, a modem, infra-red (IR) port, or other network connection device suitable for connecting to a network. The computer 206 may be connected to a network such as a local area network or a wide area network, such that information, including information about merchandise sold by the store, may be accessed from the computer 206. The information may be stored on a central computer system, such as a network fileserver, a mainframe, a secure Internet site, and the like. Furthermore, the computer 206 may execute an appropriate operating system. The appropriate operating system may include, but is not limited to, operating systems such as Linux, Unix, VxWorks®, QNX® Neutrino®, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, IBM OS/2®, Microsoft® Windows® CE, or Palm OS®. As is conventional, the appropriate operating system may advantageously include a communications protocol implementation that handles incoming and outgoing message traffic passed over the network.

The computer 206 may be connected to a server 218 that may provide the database information 214 stored in an Object Database 222 and/or a Log Data Storage 224. The server 218 may send a query to the computer 206. A query is an interrogating process initiated by the Supervisor Application 220 residing in the server 218 to acquire Log Data from the computer 206 regarding the status of the computer 206, transactional information, cashier identification, time stamp of a transaction and the like. The computer 206, after receiving a query 214 from the server 218, may retrieve information from the log data 216 to pass on relevant information back to the server 218, thereby answering the interrogation. A Supervisor Application 220 in the server 218 may control the flow of information therethrough and manage the Object Database 222 and Log Data Storage 224. When the system 200 operates in a "training" mode, the server 218 may store all or at least part of the analyzed visual data, such as features descriptors and coordinates associated with the identified features, along with other relevant information in the Object Database 222. The Object Database 222 will be discussed in greater detail later in connection with FIG. 3.

It will be understood that during system training, it may be convenient to arrange the physical connection between a visual sensor and a checkout subsystem in the proximity where they will be located in an operation mode though the mode of data connection may vary. For example, training images may be captured in a photography studio or on a "workbench," which can result in higher-quality training images and less physical strain on a human system trainer. Further, it will be understood that during system training, the computer 206 may not need to output match data 208. In one embodiment, the features of the training images may be captured and stored in the Object Database 222.

When the system 200 operates in an "operation" mode, the computer 206 may compare the visual features with the database information 214 that may include a plurality of known objects stored in the Object Database 222. If the computer 206 finds a match in the database information 214, it may return match data 208 to the checkout subsystem 206. Examples of appropriate match data will be discussed in greater detail later in connection with FIG. 3. The server 218 may provide the computer 206 with an updated, or synchronized copy of the Object Database 222 at regular intervals, such as once per hour or once per day, or when an update is requested by the computer 206 or triggered by a human user.

When the computer 206 cannot find a match, it may send a signal to the checkout subsystem 212 that may subsequently display a query on a monitor and request the operator of the checkout subsystem 212 to take an appropriate action, such as identifying the item 112 associated with the query and providing the information of the item 112 using an input device connected to the checkout subsystem 212. In one embodiment of the current invention, a signal can be sent through a wireless device to connect to an operator who may be alerted through a second wireless display device or a monitor that is capable of receiving the signal when the computer 206 cannot find a match.

In the operational mode, the checkout subsystem 212 may provide transaction data 210 to the computer 206. Subsequently, the computer 206 may send log data 216 to the server 218 that may store the data in the Log Data Storage 224, wherein the log data 216 may include data for one or more transactions. In one embodiment, the computer 206 may store the transaction data 210 locally and provide the server 218 with the stored transaction data for storage in the Log Data Storage 224 at regular intervals, such as once per hour or once per day.

The server 218, Object Database 222 and Log Data Storage 224 may be connected to a network such as a local area network or a wide area network, such that information, including information from the Object Database 222 and the Log Data Storage 224, can be accessed remotely. Furthermore, the server 208 may execute an appropriate operating system. The appropriate operating system may include but is not limited to operating systems such as Linux, Unix, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, or IBM OS/2®. As is conventional, the appropriate operating system may advantageously include a communications protocol implementation that handles incoming and outgoing message traffic passed over the network.

When the checkout subsystem 212 receives the match data 208 from the computer 206, the checkout subsystem 212 may take one or more of a wide variety of actions. In one embodiment, the checkout subsystem 212 may provide a visual and/or audible indication that a match has been found for the operator of the checkout subsystem 212. In one example, the indication may include the name of the object. In another embodiment, the checkout subsystem 212 may automatically add the item or object associated with the identified match to a list or table of items for purchase without any action required from the operator of the checkout subsystem 212. It will be understood that the list or table may be maintained in the checkout system 212 memory. In one embodiment, when the entry of merchandise or items or purchase is complete, a receipt of the items and their corresponding prices may be generated at least partly from the list or table. The checkout system 212 may also store an electronic log of the item, with a designation that it was sent by the computer 206.

As illustrated in FIG. 2A, the scale subsystem 203 may be coupled to the computer 206 and provide a reading to the computer 206. Upon visual recognition of each item, the computer 206 may look up the object database 222 to get weight information of the item. Then, the reading of the scale subsystem 203 may be compared with the weight information to check if the item is recognized correctly. In an embodiment of this invention, system 200 can include an optional UPC scanner subsystem 207. UPC scanner subsystem 207 can be used as a bar code reader of merchandise to corroborate the data capture by other sensors in system 200 or independently used for checkout as in a conventional check out system. In yet another embodiment, the UPC code of the item may be recognized with a visual sensor and the data capture by the visual sensor may be used to verify correct recognition and weight.

Figure 2B:
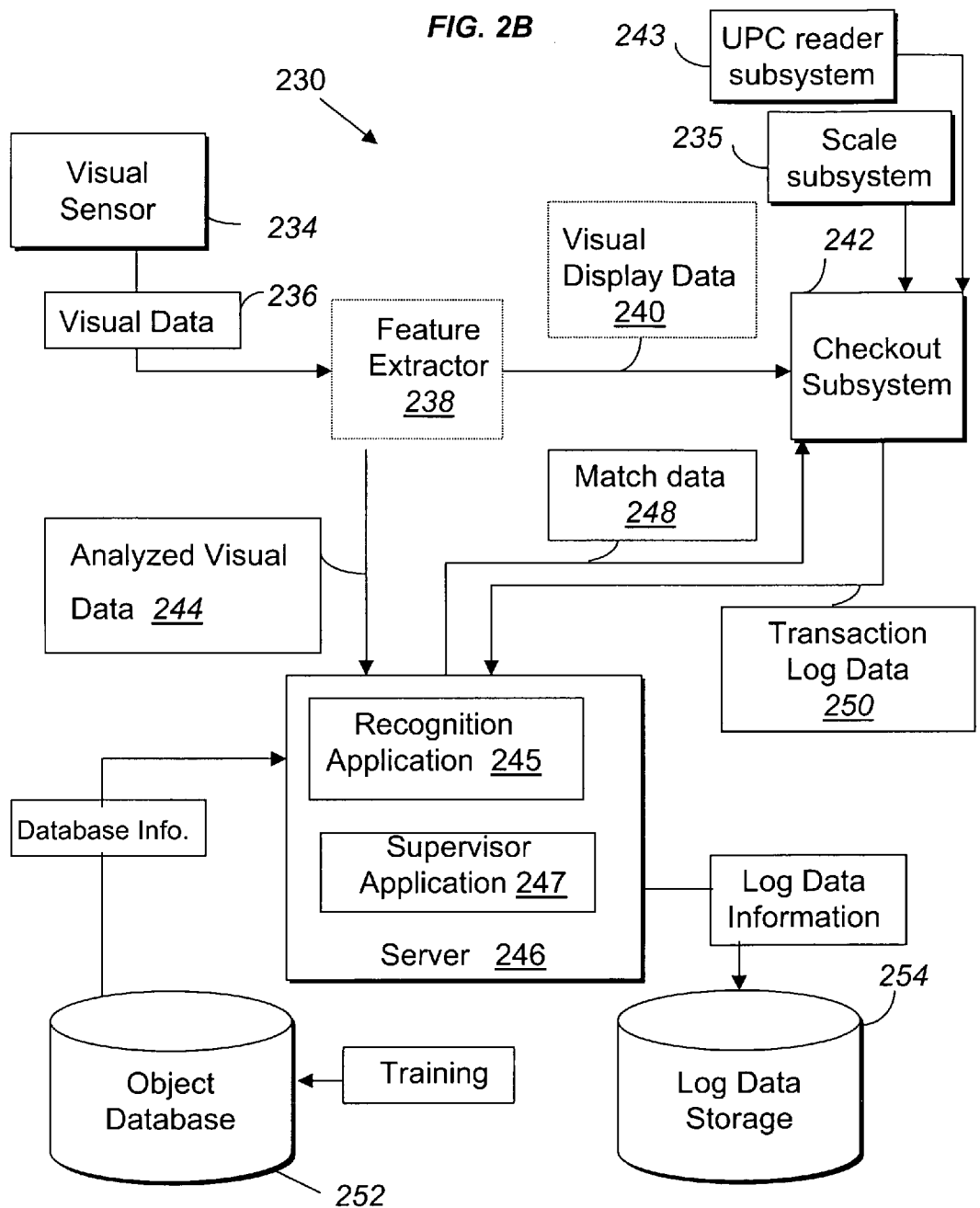
FIG. 2B illustrates another embodiment of a recognition system included in the check out system shown in FIG. 1.

FIG. 2B illustrates another embodiment 230 of a recognition system included in the self-checkout system in FIG. 1. It will be understood that the system 230 may be similar to the system 200 in FIG. 2A with some differences. Firstly, the system 230 may optionally include a feature extractor 238 for analyzing visual data 236 sent by a visual sensor 234 to extract features. The feature extractor 238 may be dedicated hardware. The feature extractor 238 may also send visual display data 240 to a checkout subsystem 242 that may include a display monitor for displaying the visual display data 240. Secondly, in the system 200, the computer 206 may analyze the visual data 204 to extract features, recognize the items associated with the visual data 204 using the extracted features and send the match data 208 to the checkout subsystem 212. In contrast, in the system 230, the feature extractor 238 may analyze the visual data 236 to extract features and send the analyzed visual data 244 to the server 246 that may subsequently recognize the items. As a consequence, the server 246 may send the match data 248 to the checkout subsystem 242. Thirdly, in the system 200, the checkout subsystem 212 may send transaction log data to the server 218 via the computer 206 while, in the system 230, the checkout subsystem 242 may send the transaction log data 250 to the server 246 directly. It is noted that both systems 200 and 230 may use the same object recognition technique, such as SIFT method, even though different components may perform the process of analysis and recognition. Fourthly, the server 246 may include a recognition application 245. Fifthly, the scale subsystem 235 and UPC reader subsystem 243 may be coupled to the checkout subsystem 242.

It is noted that the system 230 may operate without the visual display data 240. In an alternative embodiment of the system 230, the visual display data 240 may be included in the match data 248. In yet another embodiment of the system 230, raw visual data can be sent directly to the server 246.

It will be understood that the components of the system 230 may communicate with one another via connection mechanisms similar to those of the system 200. For example, the visual sensor 234 may communicate with the server 246 via an appropriate interface, such as a direct connection or a networked connection, wherein examples of interface standards may include, but are not limited to, Ethernet, IEEE 802.11, Bluetooth, Universal Serial Bus, FireWire, S-Video, NTSC composite, frame grabber, and the like. Likewise, the Object Database 252 and the Log Data Storage 254 may be similar to their counterparts of FIG. 2A.

The server 246 may execute an appropriate operating system. The appropriate operating system may include but is not limited to operating systems such as Linux, Unix, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, or IBM OS/2®. As is conventional, the appropriate operating system may advantageously include a communications protocol implementation that handles incoming and outgoing message traffic passed over the network.

The system 230 may operate in an operation mode and a training mode. In the operation mode, when the checkout subsystem 242 receives match data 248 from the server 246, the checkout subsystem 242 may take actions similar to those performed by the checkout subsystem 212. In the operational mode, the checkout subsystem 242 may provide transaction log data 250 to the server 246. Subsequently, the server 246 may store the data in the Object Database 252. In one embodiment, the checkout subsystem 242 may store the match data 248 locally and provide the server 246 with the match data for storage in the Object Database 252 at regular intervals, such as once per hour or once per day. Finally, the checkout system 230 may perform a verification to assure that the information based on the weight, visual data and UPC reading matches one another before the checkout system 230 includes merchandise into a transaction. When this information based on different sensors cannot be reconciled within the checkout system 230, the checkout system 230 may generate an alert signal to an operator. In yet another alternative embodiment of the current invention, a signal can be sent through a wireless device to connect to an operator who may be alerted through a second wireless display device or a monitor that is capable of receiving the signal when the computer 206 cannot find a match.

Figure 2C:
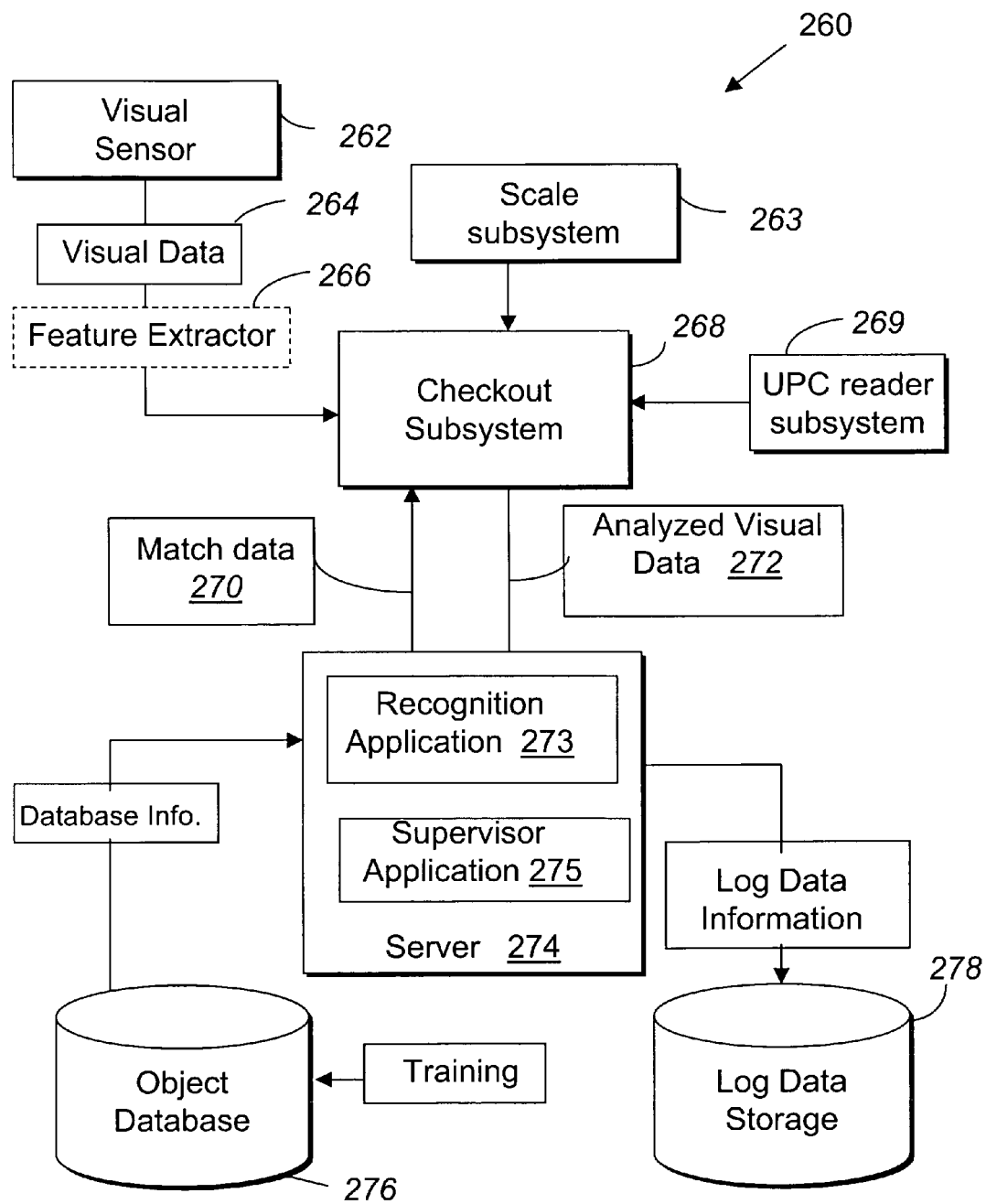
FIG. 2C illustrates yet another embodiment of a recognition system included in the check out system in shown FIG. 1.

FIG. 2C illustrates yet another embodiment of a recognition system included in the automatic checkout system in FIG. 1. The system 260 may be similar to the system 230 in FIG. 2B with a difference that the functionality of the feature extractor 238 may be implemented in a checkout subsystem 268. As illustrated in FIG. 2C, a visual sensor 262 may send visual data 264 to a checkout subsystem 268 that may analyze the data to generate analyzed visual data 272. In an alternative embodiment, the visual data 264 may be provided as an input to a server 274 via the checkout subsystem 268 if the server 274 has the capability to analyze the input and recognize the item associated with the input. In this alternative embodiment, the server 274 may receive the unmodified visual data 264 via the checkout subsystem 268, and perform the analysis and feature extraction of the unmodified visual data 264.

The checkout subsystem 268 may use a reading of a scale subsystem 263 to check if the item is recognized correctly in the same manner as described in connection with FIG. 2A. In an alternative embodiment, the reading may be input to a server 274 if the server 274 has the capability to check if the item is recognized correctly. In yet another embodiment, the checkout subsystem 268 may include a UPC reader subsystem 269.

Optionally, a feature extractor 266 may be used to extract features and generate analyzed visual data. The visual extractor 266 may be implemented within a visual sensor unit as shown in FIG. 2B or may be separate from the visual sensor. In this case, the checkout subsystem 268 may simply pass the analyzed visual data 272 to the server 274.

The system 260 may operate in an operation mode and a training mode. In the operation mode, the checkout subsystem 268 may store a local copy of the Object Database 276 which advantageously may allow the matching process to occur relatively quickly since matching will be performed in the checkout subsystem 268. During this operation mode, the log data information will be sent to log data storage 278. In the training mode, the server 274 may provide the checkout subsystem 268 with an updated, or synchronized copy of the Object Database 276 at regular intervals, such as once per hour or once per day, or when an update is requested by the checkout subsystem 268.

When the system 260 operates in the operation mode, the server 274 may send the match data 270 to the checkout subsystem 268. Subsequently, the checkout subsystem 268 may take actions similar to those performed by the checkout subsystem 242. The server 274 may also provide the match data to a Log Data Storage 278. It will be understood that the match data provided to the Log Data Storage 278 can be the same as or can differ from the match data 270 provided to the checkout subsystem 268. In one embodiment, the match data provided to the Log Data Storage 278 may include an associated timestamp, but the match data 270 provided to the checkout subsystem 268 may not include a timestamp. The Log Data Storage 278, as well as examples of appropriate match data provided for the Log Data Storage 278, will be discussed in greater detail later in connection with FIG. 3. In an alternative embodiment, the checkout subsystem 268 may store match data locally and provide the server 274 with the match data for storage in the Log Data Storage 278 at regular intervals, such as once per hour or once per day.

It will be understood that the component of the system 260 may communicate with one another via connection mechanisms similar to those of the system 230. Also, it is noted that the Object Database 276 and Log Data Storage 278 may be similar to their counterparts of FIG. 2B and explained in the following sections in connection with FIG. 3.

Optionally, the server 274 can reside inside the checkout subsystem 268 using the same processing and memory power in the checkout subsystem 268 to run both the supervisor application 275 and recognition application 273.

Figure 3:
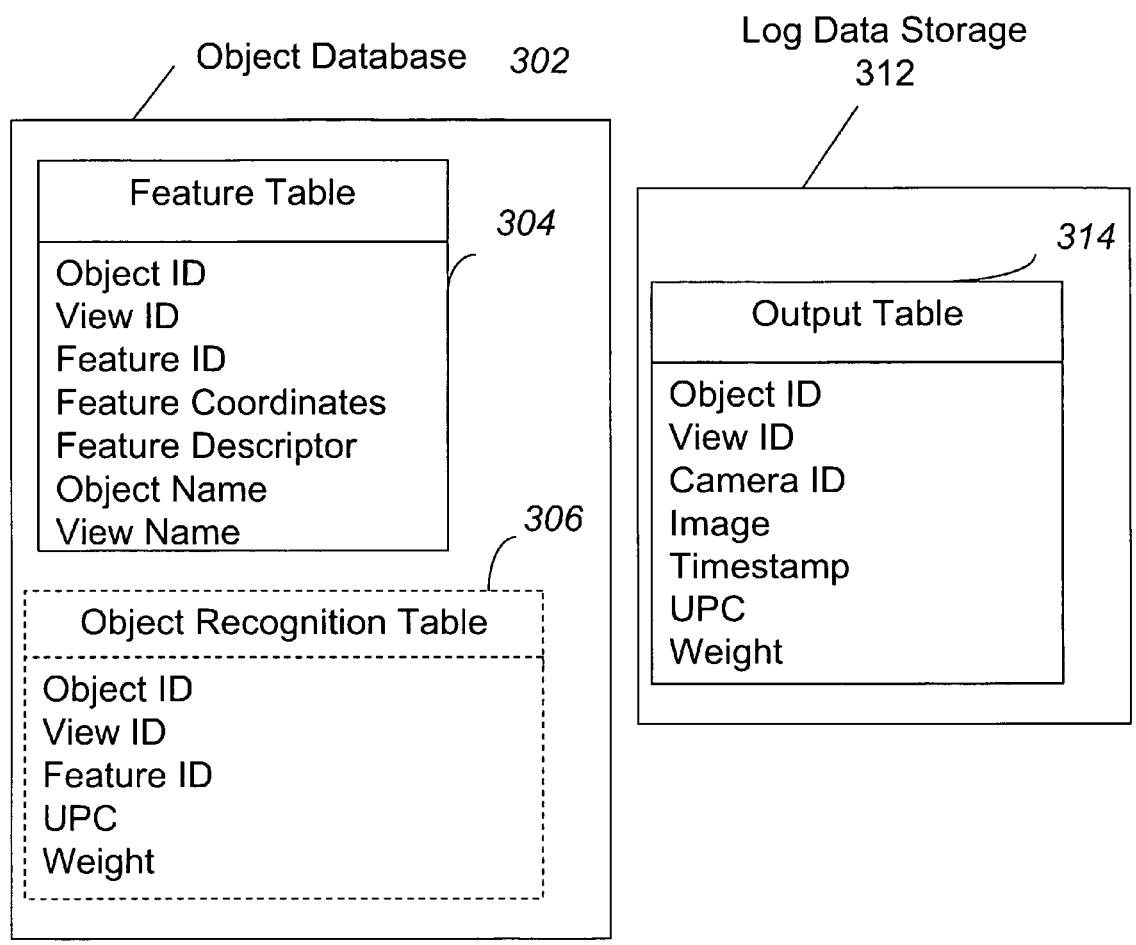
FIG. 3 illustrates one example of a data structure for a relational database that can be used with the system in FIG. 1.

FIG. 3 is a schematic diagram of an Object Database 302 and Log Data Storage 312 (or, equivalently, log data storage database) illustrating an example of a relational database structure in accordance with one embodiment of the present invention. It will be understood by one of ordinary skill in the art that a database may be implemented on an addressable storage medium and may be implemented using a variety of different types of addressable storage mediums. For example, the Object Database 302 and/or the Log Data Storage 312 may be entirely contained in a single device or may be spread over several devices, computers, or servers in a network. The Object Database 302 and/or the Log Data Storage 312 may be implemented in such devices as memory chips, hard drives, optical drives, and the like. Though the databases 302 and 312 have the form of a relational database, one of ordinary skill in the art will recognize that each of the databases may also be, by way of example, an object-oriented database, a hierarchical database, a lightweight directory access protocol (LDAP) directory, an object-oriented-relational database, and the like. The databases may conform to any database standard, or may even conform to a non-standard private specification. The databases 302 and 312 may also be implemented utilizing any number of commercially available database products, such as, by way of example, Oracle® from Oracle Corporation, SQL Server and Access from Microsoft Corporation, Sybase® from Sybase, Incorporated, and the like.

The databases 302 and 312 may utilize a relational database management system (RDBMS). In a RDBMS, the data may be stored in the form of tables. Conceptually, data within the table may be stored within fields, which may be arranged into columns and rows. Each field may contain one item of information. Each column within a table may be identified by its column name one type of information, such as a value for a SIFT feature descriptor. For clarity, column names may be illustrated in the tables of FIG. 3.

A record, also known as a tuple, may contain a collection of fields constituting a complete set of information. In one embodiment, the ordering of rows may not matter, as the desired row may be identified by examination of the contents of the fields in at least one of the columns or by a combination of fields. Typically, a field with a unique identifier, such as an integer, may be used to identify a related collection of fields conveniently.

As illustrated in FIG. 3, by way of example, two tables 304 and 306 may be included in the Object Database 302, and one table 314 may be included in the Log Data Storage 312. The exemplary data structures represented by the five tables in FIG. 3 illustrate a convenient way to maintain data such that an embodiment using the data structures can efficiently store and retrieve the data therein. The tables for the Object Database 302 may include a Feature Table 304, and an optional Object Recognition Table 306.

The Feature Table 304 may store data relating to the identification of an object and a view. For example, a view can be characterized by a plurality of features. The Feature Table 304 may include fields for an Object ID, a View ID, a Feature ID for each feature stored, a Feature Coordinates for each feature stored, and a Feature Descriptor associated with each feature stored, view name field, an object name field. The Object ID field and the View ID field may be used to identify the records that correspond to a particular view of a particular object. A view of an object may be typically characterized by a plurality of features. Accordingly, the Feature ID field may be used to identify records that correspond to a particular feature of a view. The View ID field for a record may be used to identify the particular view corresponding to the feature and may be used to identify related records for other features of the view. The Object ID field for a record may used to identify the particular object corresponding to the feature and may be used to identify related records for other views of the object and/or other features associated with the object. The Feature Descriptor field may be used to store visual information about the feature such that the feature may be readily identified when the visual sensor observes the view or object again. The Feature Coordinate field may be used to store the coordinates of the feature. This may provide a reference for calculations that depend at least in part on the spatial relationships between multiple features. An Object Name field may be used to store the name of the object and may be used to store the price of the object. The Feature Table 304 may, optionally, store additional information associated with the object. The View Name field may be used to store the name of the view. For example, it may be convenient to construct a view name by appending a spatial designation to the corresponding object name. As an illustration, if an object name is "Cola 24-Pack," and the object is packaged in the shape of a box, it may be convenient to name the associated views "Cola 24-Pack Top View," "Cola 24-Pack Bottom View," "Cola 24-Pack Front View," "Cola 24-Pack Back View," "Cola 24-Pack Left View," and "Cola 24-Pack Right View."

The optional Object Recognition Table 306 may include the Object ID field (such as a Universal Product Code), the View ID field, Weight field, UPC field, and the Feature ID field. The optional Object Recognition Table 306 may advantageously be indexed by the Feature Descriptor, which may facilitate the matching of observed images to views and/or objects.

The illustrated Log Data Storage 312 includes an Output Table 314. The Output Table 314 may include fields for an Object ID, a View ID, a Camera ID, a Timestamp, UPC, weight, and a Image. The system may append records to the Output Table 314 as it recognizes objects during operation. This may advantageously provide a system administrator with the ability to track, log, and report the objects recognized by the system. In one embodiment, when the Output Table 314 receives inputs from multiple visual sensors, the Camera ID field for a record may be used to identify the particular visual sensor associated with the record. The Image field for a record may be used to store the image associated with the record.

Figure 4:
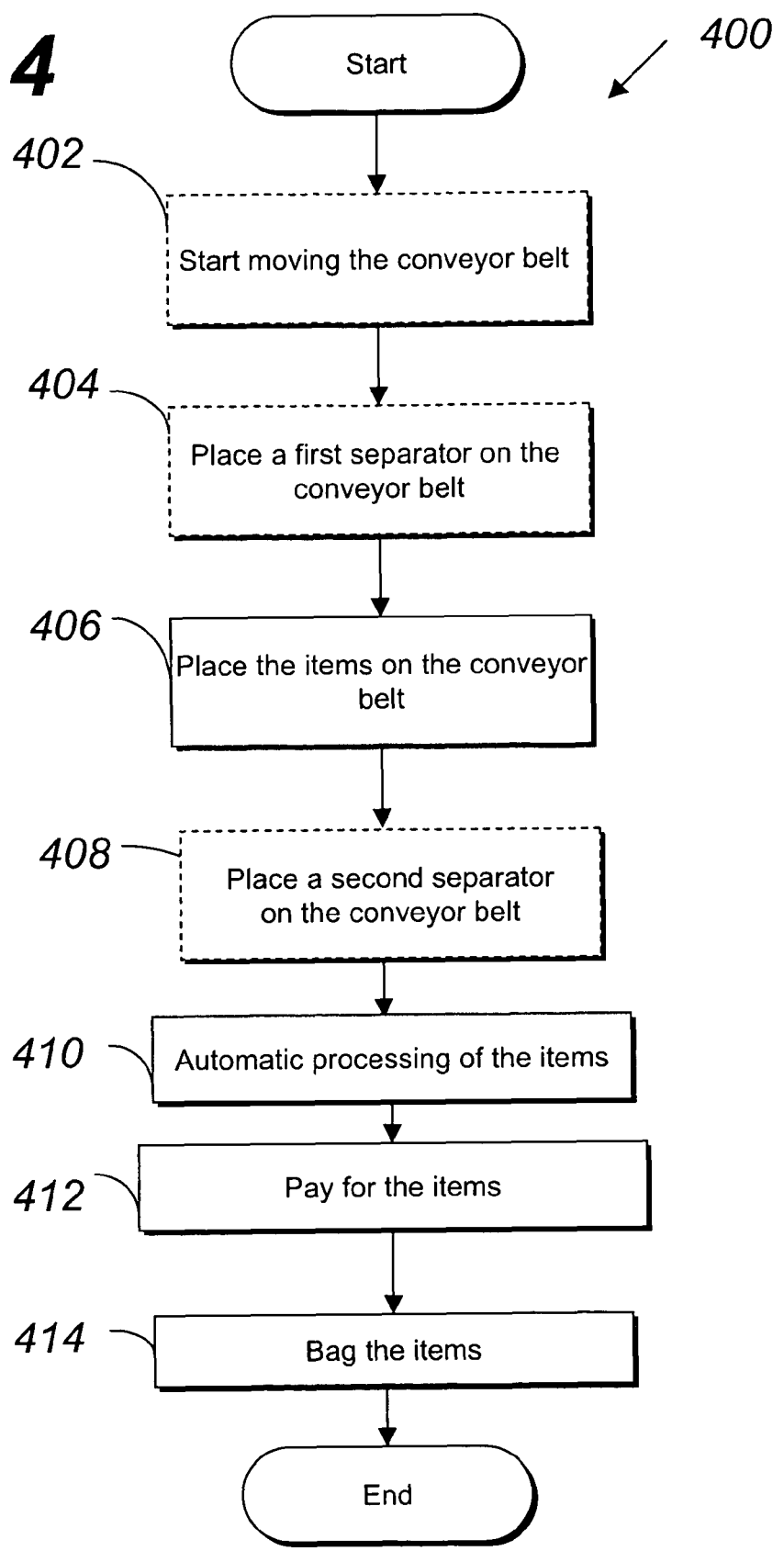
FIG. 4 is a flowchart illustrating the steps that may be carried out by the system in FIG. 1.

FIG. 4 is a flowchart 400 illustrating the steps that may be carried out by the system 100 in accordance with one embodiment of the present invention. It will be appreciated by those of the ordinary skill that the illustrated steps (or method) may be modified in a variety of ways without departing from the spirit and scope of the system or the method. For example, in another embodiment, various portions of the illustrated method may be combined, be rearranged in an alternate sequence, be removed, and the like. In addition, it should be noted that the method may be performed in a variety of ways, such as by software executing in a general-purpose computer, by firmware executed by a microprocessor, by dedicated hardware, and the like.

At the start of the method 400 illustrated in FIG. 4, it is assumed that the conveyor subsystem 110 (or, conveyor belt) is continuously moving. Optionally, as described in connection with FIG. 1, several mechanisms may start the conveyor subsystem 110 in a state 402. Next, the method advances to a state 404.

In the state 404, the customer may place a first separator 140 on the belt 110 to initiate a transaction process, where the system 100 is trained to recognize the first separator 140. Upon recognition of the first separator 140, the system 100 may start a new transaction.

Next, the customer may put one or more items 112 on the belt 110 in a state 406. Subsequently, in a state 408, the customer may put the second separator 142 as an indicator for terminating the transaction. The second separator 142 may be a plastic bar that the system 100 is trained to recognize. As an alternative to the sequence of states 404, 406 and 408, a motion detector or IR sensors may detect the start of the transaction. Then, the method proceeds to a state 410.

In the state 410, the system 100 may perform automatic processing of the items 112, wherein more details of the state 410 will be given later in connection with FIG. 5. Next, the customer may pay for the checked out items and the items may be bagged in states 412 and 414, respectively. Subsequently, the system 110 may stop the transaction.

Figure 5:
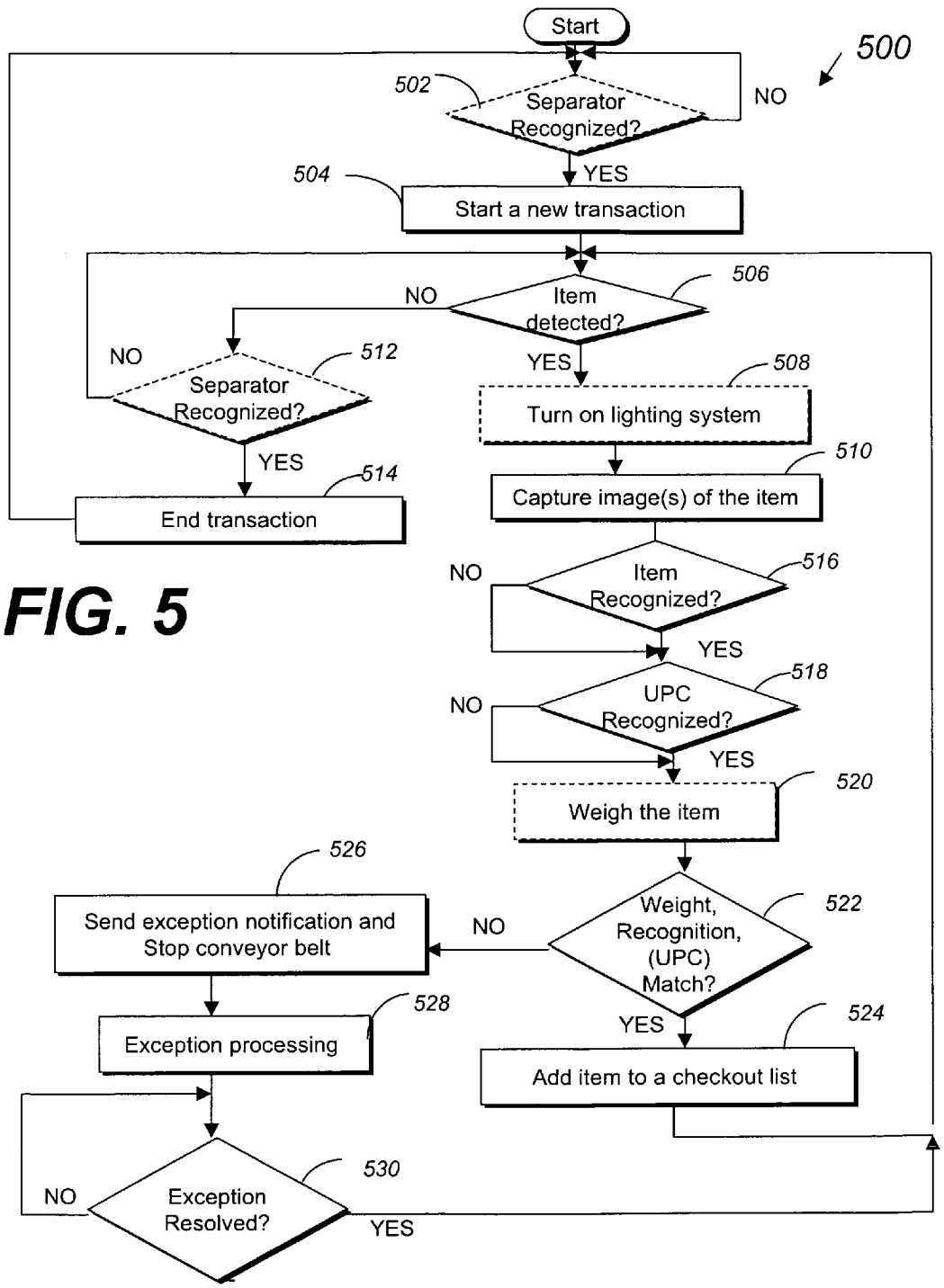
FIG. 5 is a flowchart illustrating a process to be carried out at the step of automatic processing in FIG. 4.

FIG. 5 is a flowchart 500 illustrating a process to be carried out in the operational block 410 in FIG. 4. The automatic processing may begin in a state 502. In the state 502, the system 100 may determine if the first separator 140 has entered into the housing 114 on the moving belt 110. Recognition of the first separator 140 may be done with ViPR (visual pattern recognition) or with color identification options. If the answer to the state 502 is YES, the method proceeds to a state 504 to start a new transaction for the current customer. Subsequently, the method advances to a state 506. It should be apparent to those of ordinary skills in the art that detection of a separator 140 to start a transaction is an optional feature of the system 100. A transaction can also be started by, for example, a customer pressing a start button.

In the state 506, the system 100 may check if it can detect any items 112 on the belt 110. If any item is detected in the state 506, the system 100 may optionally turn on the lighting subsystem 118 in a state 508. Next, in a state 510, the visual sensors 120 may get image(s) of the item 112. If the system 110 cannot detect any item in the state 506, the method proceeds to a state 512. In the state 512, the system 100 may determine if it can detect the second separator 142. Upon affirmative answer to the decision diamond 512, the system 100 may end the transaction in a state 514 and wait for the first separator of the next customer to start a new transaction.

Using the visual image of the item 112 obtained in the state 510, the system 100 may determine if it can recognize the merchandise 112 in a state 516. Recognition of the item may be done with ViPR that is explained in connection with FIGS. 2, 3 and 6. Alternatively, the color and shape of the item 112 may be used to recognize the item 112. Next, in one embodiment of the current invention, in a state 518, the system 100 may determine if it can recognize the UPC, where the UPC may be obtained from the visual image captured in the state 510 or the UPC may be obtained with a conventional UPC scanner. If a UPC is not in the visual image, the system 100 may not take any further steps to recognize the UPC. Then, the method proceeds to a state 520. In an alternative embodiment, the system 100 may use the UPC reader subsystem 113 as a primary recognition tool. In this embodiment, the system 100 may use the visual image to recognize the item 112 if the UPC of the item 112 cannot be recognized.

Optionally, in the state 520, the scale subsystem 122 may weigh the item 112. It is noted that the state 520 may also be performed in parallel with the states 516 and 518. Subsequently, in a state 522, the system 100 may determine if the merchandise recognized in the state 516 matches the UPC recognized in the state 518. Also, the reading of the scale subsystem 122 obtained in the state 520 may be used to determine if the recognition in the states 516 and/or 518 is correct. The system 100 may look up the object database 302 (shown in FIG. 3) to get the weight data of the merchandise recognized in the state 516. By comparing the reading of the scale subsystem 122 with the weight data, the system 100 may check if the merchandise 112 is correctly recognized in the state 516. Likewise, the system 100 may look up the same database to get the weight data of the merchandise corresponding to the UPC recognized in the state 518. By comparing the reading of the scale subsystem 122 with the weight data, the system 100 may check if the UPC is correctly recognized in the state 520. If a match is found, the system 100 may add the item to a checkout list in a state 524. Otherwise, the method proceeds to a state 526.

In the state 526, the system 100 may send an exception recognition to stop the conveyor belt 110. Then, the exception may be processed in a state 528, where the exception processing may involve a manual intervention or operator notification via a wireless device. Next, the system 100 may check if the exception is resolved in a state 530. If the answer to the state 530 is positive, the method proceeds to a state 506.

Figure 6:
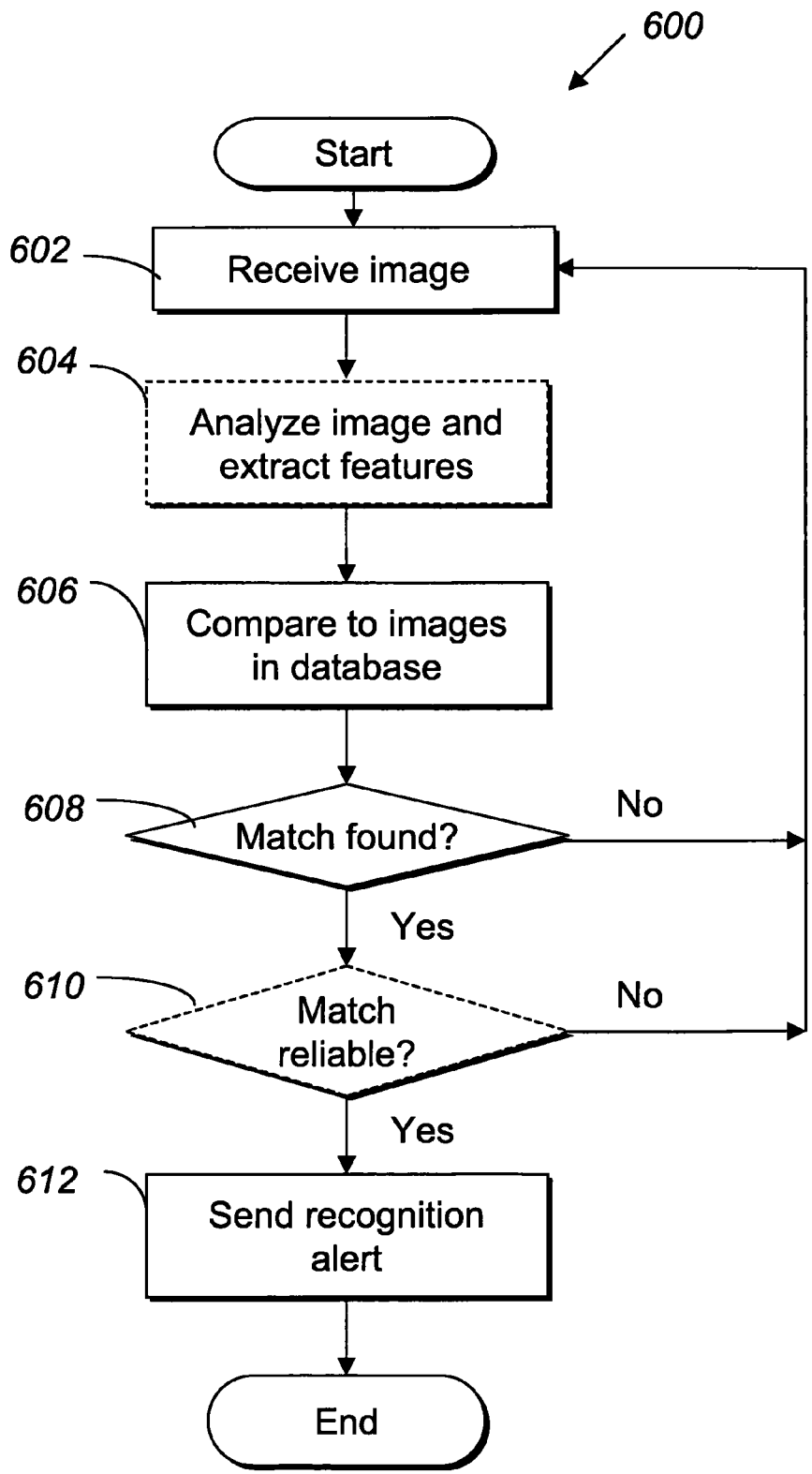
FIG. 6 is a flowchart that illustrates a process to be carried out by the recognition system in FIG. 2 in accordance with one embodiment of the present invention.

FIG. 6 is a flowchart 600 that illustrates a method to be carried out by the recognition system 200 to recognize objects in accordance with one embodiment of the present invention. It will be appreciated by those of the ordinary skill that the illustrated method may be modified in a variety of ways without departing from the spirit and scope of the present invention. For example, in another embodiment, various portions of the illustrated method may be combined, be rearranged in an alternate sequence, be removed, and the like. In addition, it should be noted that the method may be performed in a variety of ways, such as by software executing in a general-purpose computer, by firmware and/or computer readable medium executed by a microprocessor, by dedicated hardware, and the like.

At the start of the method illustrated in FIG. 6, the system 100 has already been trained or programmed to recognize selected objects. The method 600 may begin in a state 602. In the state 602, a visual sensor, such as a camera, may capture one or more images of an object to make visual data. To capture the images, as described in connection with FIG. 1, a motion trigger subsystem may trigger the visual sensor and a lighting subsystem upon detection of the object. The method may advance from the state 602 to an optional state 604.

In the optional state 604, the method may analyze the visual data acquired in the state 602 to extract visual features. As mentioned above, the process of analyzing the visual data may be performed by a computer 206, a feature extractor 238, a checkout system 268 or a server 274 (shown in FIGS. 2A-C). A variety of visual recognition techniques may be used, and it will be understood by one of ordinary skill in the art that an appropriate visual recognition technique may depend on a variety of factors, such as the visual sensor used and/or the visual features used. In one embodiment, the visual features may be identified using an object recognition process that can identify visual features. In one example, the visual features may correspond to SIFT features. Next, the method may advance from the state 604 to a state 606.

In the state 606, the identified visual features may be compared to visual features stored in a database, such as an Object Database 222. In one embodiment, the comparison may be done using the SIFT method described earlier. The method may find one match, may find multiple matches, or may find no matches. In one embodiment, if the method finds multiple matches, it may, based on one or more measures of the quality of the matches, designate one match, such as the match with the highest value of an associated quality measure, as the best match. Optionally, a match confidence may be associated with a match, wherein the confidence is a variable that is set by adjusting a parameter with a range, such as 0% to 100%, that may relate to, for example, the fraction of the features that are recognized as matching between the visual data and a particular stored image, or stored set of features. The parameter with a range may also relate to factors including but not limited to re-projection of the feature distance or conditional numbers of affine transform, where these parameters are well known in the art. If the match confidence does not exceed a pre-determined threshold, such as a 90% confidence level, the match may not be used. In one embodiment, if the method finds multiple matches with match confidence that exceed the pre-determined threshold, the method may return all such matches. The method may advance from the state 606 to a decision block 608.

In the decision block 608, a determination may be made as to whether the method found a match in the state 606. If the method does not identify a match in the state 608, the method may return to the state 602 to acquire another image. If the method identifies a match in the state 608, the method may proceed to an optional decision block 610.

In the optional decision block 610, a determination may be made as to whether the match found in the state 606 is considered reliable. In one embodiment, when a match is found, the system 100 may optionally wait for one or more extra cycles to compare the matched object from these extra cycles, so that the system 100 can more reliably determine the true object. In one implementation, the system 100 may verify that the matched object is identically recognized for two or more cycles before determining a reliable match. Another implementation may compute the statistical probability that each object that can be recognized is present over several cycles. In another embodiment, a match may be considered reliable if the value of the associated quality measure or associated confidence exceeds a predetermined threshold. In another embodiment, a match may be considered reliable if the number of identified features exceeds a predetermined threshold. In another embodiment, a secondary process, such as matching against a smaller database, may be used to compare this match to any others present. In yet another embodiment, the optional decision block 610 may not be used, and the match may always be considered reliable. In one other embodiment, several visual sensors can be used to increase the reliability of recognition.

If the optional decision block 610 determines that the match is not considered reliable, the method may return to the state 602 to acquire another image. If the method determines that the match is considered reliable, the method may proceed to a state 612.

In the state 612, the method may send a recognition alert, where the recognition alert may be followed by one or more actions. Exemplary action may be displaying item information on a display monitor of a checkout subsystem, adding the item to a shopping list, sending match data to a checkout subsystem, or storing match data into Log Data Storage.

Figure 7:
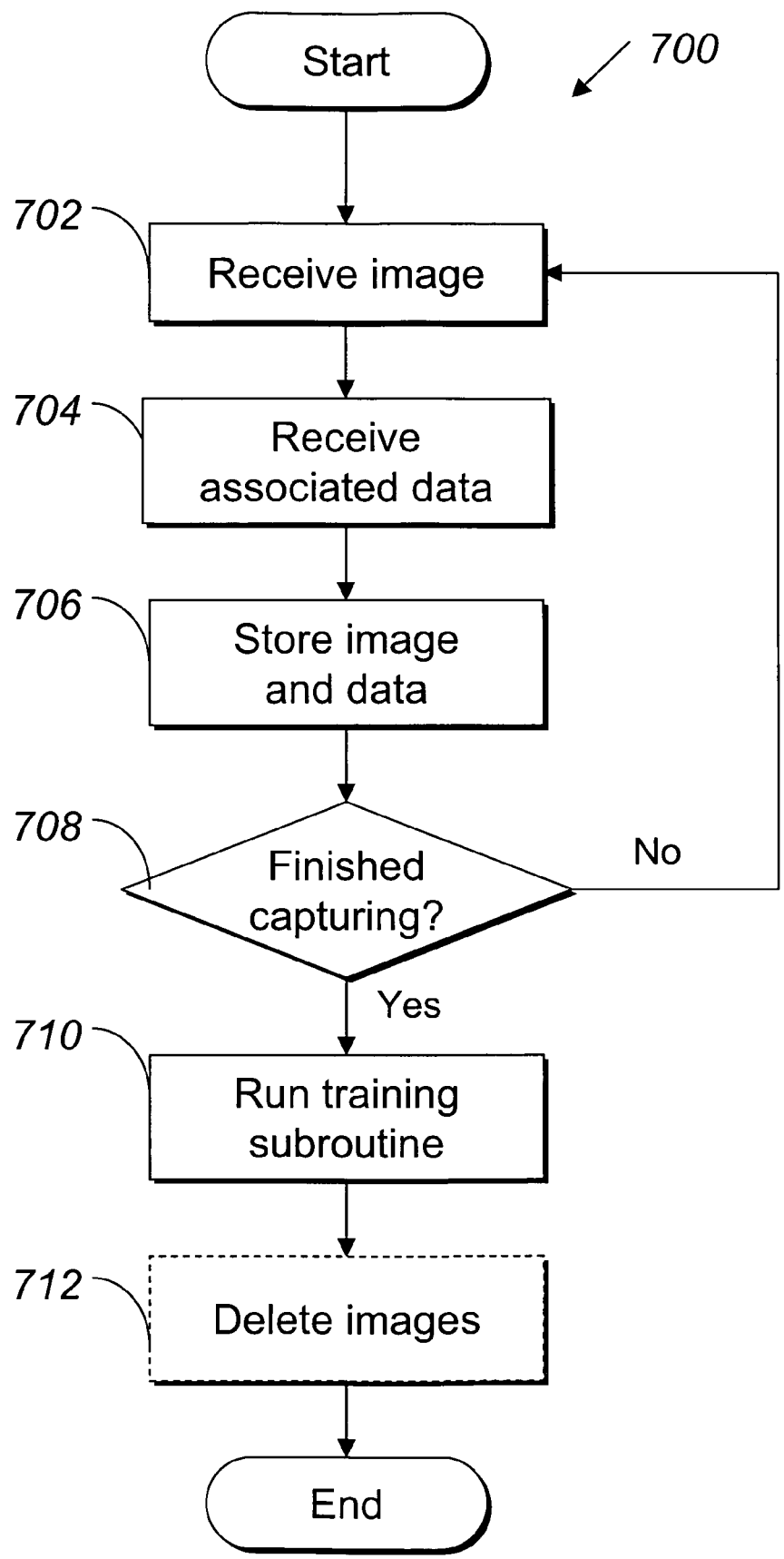
FIG. 7 is a flowchart that illustrates a process for training the system in FIG. 1 in accordance with one embodiment of the present invention.

FIG. 7 is a flowchart 700 that illustrates a method for training the system 100 in accordance with one embodiment of the present invention. It will be appreciated by those of ordinary skill that the illustrated method may be modified in a variety of ways without departing from the spirit and scope of the present invention. For example, in another embodiment, various portions of the illustrated method may be combined, be rearranged in an alternate sequence, be removed, and the like. In addition, it should be noted that the method may be performed in a variety of ways, such as by software executing in a general-purpose computer, by firmware and/or computer readable medium executed by a microprocessor, by dedicated hardware, and the like.

The method may begin in a state 702. In the state 702, the method may receive visual data of an item from a visual sensor, such as a camera. As described earlier, it may be convenient, during system training, to use a visual sensor that is not connected to a checkout subsystem. For example, training images may be captured in a photography studio or on a "workbench," which may result in higher-quality training images and less physical strain on a human system trainer. The method may advance from the state 702 to a state 704. In one embodiment, the system may receive electronic data from the manufacturer of the item, where the electronic data may include information associated with the item, such as merchandise specifications, weights, UPC and visual images.

In the state 704, the method may receive data associated with the image received in the state 702. Data associated with an image may include, for example, the distance between the visual sensor and the object of the image at the time of image capture, may include an object name, may include a view name, may include an object ID, may include a view ID, may include a unique identifier, may include a text string associated with the object of the image, may include a name of a computer file (such as a sound clip, a movie clip, or other media file) associated with the image, may include a price of the object of the image, may include the UPC associated with the object of the image, and may include a flag indicating that the object of the image is a relatively high security-risk item. The associated data may be manually entered, may be automatically generated or retrieved, or a combination of both. For example, in one embodiment, the operator of the system 100 may input all of the associated data manually. In another embodiment, one or more of the associated data items, such as the object ID or the view ID, may be generated automatically, such as sequentially, by the system. In another embodiment, one or more of the associated data items may be generated through another input method. For example, a UPC associated with an image may be inputted using a barcode scanner.

Several images may be taken at different angles or poses with respect to a specific item. Preferably, each face of an item that needs to be recognized should be captured. In one embodiment, all such faces of a given object may be associated with the same object ID, but associated with different view IDs. Additionally, if an item that needs to be recognized is relatively malleable and/or deformable, such as a bag of pet food or a bag or charcoal briquettes, several images may be taken at different deformations of the item. It may be beneficial to capture a relatively high-resolution image, such as a close-up, of the most visually distinctive regions of the object, such as the product logo. It may also be beneficial to capture a relatively high-resolution image of the least malleable portions of the item. In one embodiment, all such deformations and close-ups captured of a given object may be associated with the same object ID, but associated with different view IDs. The method may advance from the state 704 to a state 706. In the case of recognizing produce and/or fruit, the shapes and colors of the items may be taken at different angles or directions in order to capture a sample of the variety of the items.

In the state 706, the method may store the image received in the state 702 and the associated data collected in the state 704. In one embodiment, the system 100 may store the image and the associated data in a database, which was described earlier in connection with FIGS. 2A-C. The method may advance to a decision block 708.

In the decision block 708, the method may determine whether or not there are additional images to capture. In one embodiment, the system 100 may ask an operator whether or not there are additional images to capture, and the user's response may determine the action taken by the method. In this embodiment, the query to the user may be displayed on a checkout subsystem and the operator may respond via the input devices of the checkout subsystem. If there are additional images to capture, the method may return to the state 702 to receive an additional image. If there are no additional images to capture, the method may proceed to a state 710.

In the state 710, the method may perform a training subprocess on the captured image or images. In one embodiment, the method may scan the database that contains the images stored in the state 706, select images that have not been trained, and run the training subroutine on the untrained images. For each untrained image, the system 100 may analyze the image, find the features present in the image and save the features in the Object Database 222. The method may advance to an optional state 712.

In the optional state 712, the method may delete the images on which the system 100 was trained in the state 710. In one embodiment, the matching method described earlier in connection with FIG. 6 may use the features associated with a trained image and may not use the actual trained image. Advantageously, deleting the trained images may reduce the amount of disk space or memory required to store the Object Database. Then, the method may end and be repeated as desired.

In one embodiment, the system 100 may be trained prior to its initial use, and additional training may be performed repeatedly. It will be understood that the number of training images acquired in different training cycles may vary in a wide range.

As described above, embodiments of the system and method may advantageously permit one or more visual sensors, such as one or more cameras, operatively coupled to a computer system to view and recognize items located on a conveyor subsystem of a retail store environment. These self-checkout systems may advantageously increase the checkout out speed and replace cashiers, and as a consequence, may reduce labor and turnover costs.

It should be understood, of course, that the foregoing relates to exemplary embodiments of the invention and that modifications may be made without departing from the spirit and scope of the invention as set forth in the following claims.

What is claimed is:

1. A system for automatically checking out an object, comprising:
   a scale subsystem for measuring a weight of the object;
   a visual sensor for capturing an image of the object;
   a visual subsystem coupled to the visual sensor, wherein the visual subsystem is configured to:
   i) extract multiple scale-invariant visual features from the image, each of the multiple scale-invariant visual features having an associated feature descriptor defined by a feature vector;
   ii) compare the extracted feature vectors to a plurality of feature vectors associated with a plurality of known objects, each of the known objects having multiple ones of the plurality of feature vectors associated therewith, and
   iii) identify multiple ones of the extracted feature vectors that match a subset of the feature vectors associated with one of the known objects; and
   a check out subsystem, coupled to the visual subsystem and the scale subsystem, configured to identify the object based on the matching feature vectors and the measured weight.

2. The system of claim 1, further comprising:
   a conveyor subsystem located adjacent to the scale subsystem configured to move the object.

3. The system of claim 2, further comprising:
   a housing that encloses a portion of the conveyor subsystem.

4. The system of claim 3, wherein the visual sensor is mounted on the housing.

5. The system of claim 4, further comprising:
   a lighting subsystem that illuminates an area within the housing and is mounted on the housing.

6. The system of claim 5, further comprising:
   a motion trigger subsystem for detecting the object and triggering the lighting subsystem and the visual sensor.

7. The system of claim 1, wherein the visual subsystem is a server.

8. The system of claim 1, wherein a color and a shape of the object are used to identify the object.

9. The system of claim 1, wherein, upon identification of the object, the checkout subsystem retrieves color and shape information from a database, and compares the retrieved color and shape information with color and shape information from the image to verify that the identification is correct.

10. The system of claim 1, wherein the visual subsystem is further configured to determine a size of the object.

11. The system of claim 1, wherein the visual sensor comprises a conventional UPC reader for reading a UPC on the object.

12. The system of claim 1, further comprising:
a UPC reader subsystem configured to read a UPC on the object depicted in the image.

13. The system of claim 1, wherein the checkout subsystem retrieves weight information associated with the identified object upon recognition of the object, and compares the measured weight of the object with the retrieved weight information to verify that the recognition is correct.

14. The system of claim 1, wherein the image from which the visual subsystem is configured to extract the multiple scale-invariant visual features is raw image data from the visual sensor.

* * * * *

UNITED STATES PATENT AND TRADEMARK OFFICE
CERTIFICATE OF CORRECTION

| | | |
|---|---|---|
| PATENT NO. | : 8,430,311 B2 | Page 1 of 1 |
| APPLICATION NO. | : 12/074263 | |
| DATED | : April 30, 2013 | |
| INVENTOR(S) | : Jim Ostrowski et al. | |

It is certified that error appears in the above-identified patent and that said Letters Patent is hereby corrected as shown below:

In the Specification

<u>Column 6</u>
Line 2, change "result a false" to --result in a false--.

<u>Column 9</u>
Line 12, change "items or purchase" to --items for purchase--.

<u>Column 13</u>
Line 17, change "a Image" to --an Image--.

<u>Column 18</u>
Line 19, change "out speed" to --speed--.

Signed and Sealed this
Twenty-seventh Day of October, 2015

Michelle K. Lee
*Director of the United States Patent and Trademark Office*